(12) United States Patent
Czyszczewski et al.

(10) Patent No.: US 7,664,686 B2
(45) Date of Patent: Feb. 16, 2010

(54) SYSTEMS AND MEDIA FOR MANAGING ELECTRONIC ASSET TAGS FOR ASSET DEVICES

(75) Inventors: Joseph Stanley Czyszczewski, Longmont, CO (US); James Anthony Krack, Boulder, CO (US); Harry Reese Lewis, Jr., Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/132,485

(22) Filed: Jun. 3, 2008

(65) Prior Publication Data

US 2008/0228603 A1    Sep. 18, 2008

Related U.S. Application Data

(63) Continuation of application No. 11/134,922, filed on May 23, 2005, now Pat. No. 7,400,251.

(51) Int. Cl.
*G06Q 10/00* (2006.01)
*G08B 13/14* (2006.01)

(52) U.S. Cl. .................. 705/28; 340/572.1
(58) Field of Classification Search ............ 705/28; 340/572.1, 572.4, 539.13, 825.49; 235/375
See application file for complete search history.

(56) References Cited

U.S. PATENT DOCUMENTS

| | | | |
|---|---|---|---|
| 6,300,863 B1 * | 10/2001 | Cotichini et al. ............ | 340/5.8 |
| 6,525,672 B2 * | 2/2003 | Chainer et al. .............. | 340/904 |
| 6,738,628 B1 * | 5/2004 | McCall et al. ............... | 455/456.1 |
| 6,747,555 B2 * | 6/2004 | Fellenstein et al. .......... | 340/524 |
| 7,061,367 B2 * | 6/2006 | Mosgrove et al. ........... | 340/5.21 |
| 7,135,977 B2 * | 11/2006 | Burg et al. .................. | 340/572.1 |
| 7,138,914 B2 * | 11/2006 | Culpepper et al. .......... | 340/539.13 |
| 7,180,422 B2 * | 2/2007 | Milenkovic et al. ......... | 340/572.4 |

(Continued)

OTHER PUBLICATIONS

Herdeen, Frederick C, Maynard, Bill, and Thompson, Amy. "Get a lock on inventory." Security Management Oct. 1, 1996: ABI/INFORM Global, ProQuest. Web. Sep. 23, 2009.*

Maggie DeWitt. "Is RFID in Your Future?" Business Forms, Labels & Systems May 20, 2005: ABI/INFORM Global, ProQuest. Web. Sep. 23, 2009.*

(Continued)

*Primary Examiner*—Matthew S Gart
*Assistant Examiner*—Ashford S Hayles
(74) *Attorney, Agent, or Firm*—Rabindranath Dutta; Konard Raynes & Victor LLP

(57) ABSTRACT

Systems, methods, and media for managing electronic asset tags for asset devices are disclosed. Embodiments include a system having one or more asset devices in communication with a network where each asset device has an electronic asset tag, where the electronic asset tag has contents including an asset number associated with the asset device having the electronic asset tag. The system may also include an asset tag manager in communication with the network to access the contents of the electronic asset tags of the one or more asset devices. In a further embodiment, the asset tag manager may be adapted to modify the contents of the electronic asset tags of the one or more asset devices. In another further embodiment, the asset tag manager may be adapted to reload to an asset device the contents of the electronic asset tag of the asset device.

10 Claims, 5 Drawing Sheets

U.S. PATENT DOCUMENTS

| | | |
|---|---|---|
| 7,246,754 B2 * | 7/2007 | Siuta et al. .................. 235/492 |
| 7,400,251 B2 * | 7/2008 | Czyszczewski et al. .. 340/572.1 |
| 2002/0082997 A1 * | 6/2002 | Kobata et al. ................. 705/51 |
| 2003/0046589 A1 * | 3/2003 | Gregg ........................ 713/201 |
| 2003/0154266 A1 * | 8/2003 | Bobick et al. ............... 709/223 |
| 2004/0024570 A1 | 2/2004 | Muehl et al. |
| 2004/0062203 A1 * | 4/2004 | Austermann et al. ........ 370/241 |
| 2004/0093408 A1 * | 5/2004 | Hirani et al. ................ 709/224 |
| 2005/0209947 A1 * | 9/2005 | Shafer ........................ 705/36 |
| 2006/0026316 A1 * | 2/2006 | Milenkovic et al. ........... 710/62 |

OTHER PUBLICATIONS

U.S. Appl. No. 12/133,275, filed Jun. 4, 2008, entitled "Systems, Methods, and Media for Managing Electronic Asset Tags for Asset Devices", invented by J.S. Czyszczewski, J.A. Krack, and H.R. Lewis Jr., 26 pp.

Chinese Office Action dated Jul. 24, 2009 for Chinese application No. 200610084475.9 filed May 23, 2006.

* cited by examiner

SYSTEMS AND MEDIA FOR MANAGING ELECTRONIC ASSET TAGS FOR ASSET DEVICES

CROSS-REFERENCE TO RELATED APPLICATIONS

This application is a continuation of application Ser. No. 11/134,922 filed on May 23, 2005, which is incorporated herein by reference in its entirety.

FIELD OF INVENTION

The present invention generally relates to the field of computer systems. More particularly, the present invention relates to systems, methods, and media for managing electronic asset tags for asset devices.

BACKGROUND

Outsourcing is a major trend in the Information Technology (IT) industry. In some outsourced engagements, the outsourcer deploys outsourcer-owned devices at different geographical locations of the customer. A customer may outsource its printing services, for example, by engaging an outsourcer to deploy its printers at the customer's facilities. The outsourcer in this arrangement will typically own the printers and be responsible for their maintenance. The outsourcer will then typically charge the customer a flat rate and/or a cost per printed page. Such an outsourcing arrangement benefits customers by providing use of the equipment without having to purchase expensive capital assets or having to maintain such assets, while the outsourcer benefits by having a relatively stable source of income from its outsourcing services. Outsourcing arrangements are likely to increase as more and more companies or other organizations desire to reduce their investment in capital equipment or other assets.

Organizations track assets in order to provide records for depreciation or other financial record needs. In order to track their assets, outsourcing organizations typically assign asset numbers to particular pieces of equipment to facilitate tracking and audits by the outsourcer's business control organization. The asset number is often independent from the serial number for the equipment and is instead used for internal controls. One common solution to implement asset numbers for a large group of assets is to use physical asset tags. In this implementation, the asset number is printed on a sticker or label and attached directly to the asset. This allows outsourcer personnel to walk up to the asset and quickly read the asset number from the asset tag.

Physical asset tags, however, are plagued by a number of problems. First, physical asset tags must be physically applied to the assets, requiring significant costs in labor and time. Outsourcers often, for example, physically apply the asset tag at a consolidation center prior to delivery to a customer or at the customer facility itself. Applying the asset tag at a consolidation center results in additional incurred costs and delays for transportation to the consolidation center as well as the costs of unpacking and repacking the asset in order to attach the asset tag. Physical asset tags also require auditors from the outsourcing organization's business controls group to physically view the assets at the customer facility, requiring the costs and delays of transportation to the customer facilities (which may be worldwide) as well as a possible distraction or inconvenience for the customer. Another potential problem with physical asset tags is that errors which result in a mismatch of the physical asset tag and the device manufacturer's serial number require manual labor to reconcile. Such errors occur when the serial number changes as hardware is replaced for repair, resulting in the mismatch of the physical asset tag and serial number. Yet another problem is the possibility of a transcription error when an auditor or other person records the value of an asset number.

Another solution for outsourcers is to utilize Radio Frequency Identification (RFID) asset tags. RFID asset tags contain a small transponder that remains in a sleep state until activated by a signal from an activator, after which the RFID asset tag emits a radio signal containing the asset number of the device with the RFID asset tag. The activator receives the radio signal and asset number and then forwards the information to another computer system. An employee of the outsourcer may thus walk around a customer facility to gather RFID asset tag information, eliminating the need to transcribe a physical asset tag and saving time. RFID asset tags, while powerful, retain the disadvantages of the physical asset tags, as they require physical attachment to the asset device and require an auditor to be in physical proximity to the asset device in order to receive the RFID asset tag transmission.

There is, therefore, a need for an effective and efficient system to manage asset devices. There is an even greater need for such a system when the asset devices are geographically distributed over a large area.

SUMMARY OF THE INVENTION

The problems identified above are in large part addressed by systems, methods, and media for managing electronic asset tags of asset devices. One embodiment generally provides a method for accessing an electronic asset tag of an asset device, the electronic asset tag having contents comprising an asset number. The method may also generally include providing electronic asset tag authorization to the asset device and, after providing the electronic asset tag authorization, modifying the contents of the electronic asset tag of the asset device. Further embodiments may include initializing a network connection with the asset device or, after modifying the electronic asset tag, recording an indication of a status for the electronic asset tag. A further embodiment may include recording the contents of the electronic asset tag to a backup device and reloading the contents of the electronic asset tag from the backup device to the electronic asset tag of the asset device.

Another embodiment provides a machine-accessible medium containing instructions effective, when executing in a data processing system, to cause the system to perform a series of operations for synchronizing a database on a network. The series of operations generally includes accessing an electronic asset tag of an asset device, the electronic asset tag having contents comprising an asset number. The series of operations may also generally include providing electronic asset tag authorization to the asset device and, after providing the electronic asset tag authorization, modifying the contents of the electronic asset tag of the asset device. Further embodiments may include initializing a network connection with the asset device or, after modifying the electronic asset tag, recording an indication of a status for the electronic asset tag. A further embodiment may include recording the contents of the electronic asset tag to a backup device and reloading the contents of the electronic asset tag from the backup device to the electronic asset tag of the asset device.

A further embodiment provides a system for managing asset numbers. The system may include one or more asset devices in communication with a network where each asset device having an electronic asset tag, where the electronic asset tag has contents including an asset number associated with the asset device having the electronic asset tag. The system may also include an asset tag manager in communication with the network to access the contents of the electronic asset tags of the one or more asset devices. In a further embodiment, the asset tag manager may be adapted to modify the contents of the electronic asset tags of the one or more asset devices. In another further embodiment, the asset tag manager may be adapted to reload to an asset device the contents of the electronic asset tag of the asset device.

BRIEF DESCRIPTION OF THE DRAWINGS

Other objects and advantages of the invention will become apparent upon reading the following detailed description and upon reference to the accompanying drawings in which, like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Methods, systems, and media for managing electronic asset tags for asset devices are disclosed. Embodiments include a system having one or more asset devices in communication with a network where each asset device has an electronic asset tag, where the electronic asset tag has contents including an asset number associated with the asset device having the electronic asset tag. The system may also include an asset tag manager in communication with the network to access the contents of the electronic asset tags of the one or more asset devices. In a further embodiment, the asset tag manager may be adapted to modify the contents of the electronic asset tags of the one or more asset devices. In another further embodiment, the asset tag manager may be adapted to reload to an asset device the contents of the electronic asset tag of the asset device.

The systems, methods, and media of the disclosed embodiments provide an improved methodology for managing and tracking asset devices. The electronic asset tag provides a relatively permanent and efficient method for managing individual asset devices which may be geographically spread across the world. The asset tag manager allows for a centralized repository of asset number information which may be updated and maintained without requiring individuals to physically visit the asset devices, potentially saving large amounts of time and money for organizations with distributed assets. Electronic asset tags may also reduce or eliminate transcription errors as well as reducing the number of mismatches between asset tags and device serial numbers. Electronic asset tags, which may include the asset number, may be restored in the event of device failure from either the central asset tag manager or a local external device, providing an additional layer of permanence to the asset number. Organizations desiring to track assets for depreciation or other purposes may use the disclosed system to assist in tracking and managing their assets, saving a significant amount of resources when assets are widely distributed.

Figure 1:
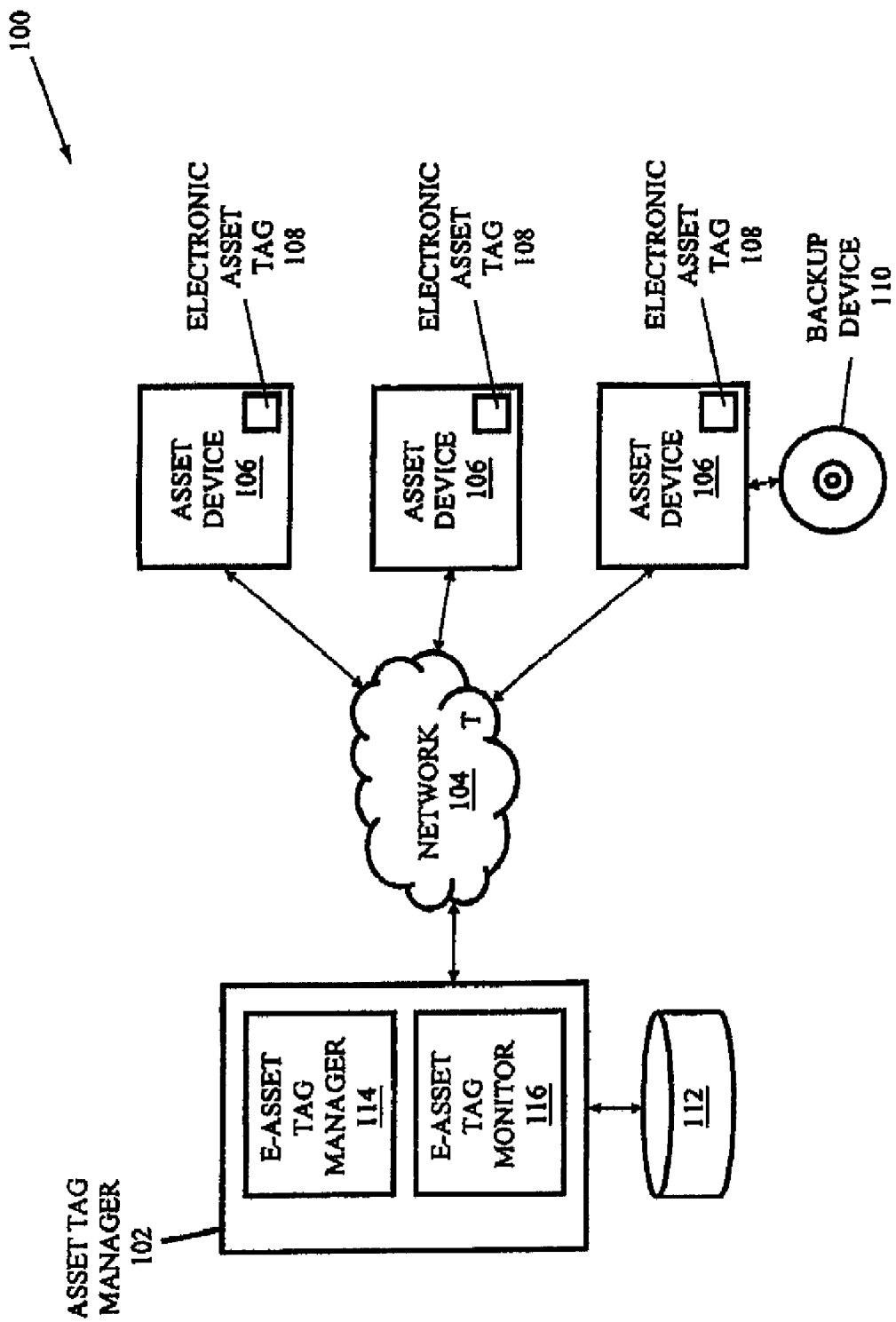
FIG. 1 depicts an environment for managing electronic asset tags for one or more asset devices according to one embodiment.

Turning now to the drawings, FIG. 1 depicts an environment for managing electronic asset tags for one or more asset devices according to one embodiment. Asset management system 100 may include an asset tag manager 102 in communication with one or more asset devices 106 via a network 104. Each asset device 106 may contain an electronic asset tag 108 which itself contains an asset number associated with the asset devices 106. The asset management system 100 may facilitate tracking and updating of asset numbers (and electronic asset tags 108 that contain them) by the asset tag manager 102 for each of the asset devices 106. In addition to the capabilities of the asset tag manager 102, an authorized person in the same physical location as an asset device 106 may also access and/or update the asset number.

The components of the asset management system 100 may be located at the same location, such as in the same building or computer lab, or could be remote. While the term "remote" is used with reference to the distance between the components of the asset management system 100, the term is used in the sense of indicating separation of some sort, rather than in the sense of indicating a large physical distance between the systems. In one example, the asset tag manager 102 may be located at a central location of an outsourcer while a plurality of asset devices 106 are distributed across a customer's facilities worldwide.

Network 104 may be any type of data communications channel, such as the Internet, an intranet, a LAN, a WAN, an Ethernet network, or a wireless network. Those skilled in the art will recognize that any type of data communication channel between the asset tag manager 102 and the asset devices 106 may be used without departure from the scope and spirit of the invention.

The asset tag manager 102 may, in one embodiment, be software and/or state machines implemented on one or more of any type of computer system, including servers, personal computers, workstations, mainframe computers, notebook or laptop computers, desktop computers, or the like. In one example, the asset tag manager 102 or any of its components may be implemented on an IBM® eServer or similar server having one or more processors, or threads of processors, executing software and/or one or more state machines coupled with data storage devices such as random access memory (RAM), read only memory (ROM), flash memory, compact disk drives, hard drives, and the like. In one embodiment, the asset tag manager 102 may include an e-asset tag manager 114 and an e-asset tag monitor 116. The asset tag manager 102 may also be in communication with or include a database 112 for storage of asset tags or any other information.

The e-asset tag manager 114 may remotely and electronically set the asset number for any of the asset devices 106. In one embodiment, a user of the asset tag manager 102 may use the e-asset tag manager 114 to remotely set the asset number of the electronic asset tag 108 for one or more asset devices 106 without having to be in physical proximity to the asset device 106. The user, through the e-asset tag manager 114, may optionally provide authorization to the electronic asset tag 108 before being permitted to set or otherwise modify the asset number of the electronic asset tag 108. Requiring authorization helps ensure integrity of the information stored in the electronic asset tag 108 as only users having the proper authorization will be permitted to modify or set the contents of the electronic asset tag 108. Authorization may be performed in any manner, such as by requiring one or more of a proper password, digital signatures, digital authentication, computer system identification, or the like. The e-asset tag manager 114 may also require authorization for read operations in addition to modify operations to help avoid issues such as "spoofing".

The e-asset tag monitor 116 may remotely monitor the contents of the electronic asset tags 108 of a plurality of distributed asset devices 106. An auditor or other user, for example, may view the contents of any electronic asset tags 108 without having to leave their current location. In one embodiment, the e-asset tag monitor 116 may access the electronic asset tags 108 automatically to ascertain the status of the asset devices 106. In another embodiment, the e-asset tag monitor 116 may access the electronic asset tags 108 upon user request or upon a user-defined schedule. The e-asset tag monitor 116 may use any methodology to access the information within the electronic asset tags 108. The e-asset tag monitor 116 may also store content from the electronic asset tags 108 in database 112 for later retrieval or access.

The one or more asset devices 106 may be any physical assets for which asset numbers are used. Asset devices 106 may include printers (such as large system printers), computer systems or components, industrial devices, robotic devices, or any other device. In one embodiment, each asset device 106 may be connected with network 104, allowing the asset device 106 to communicate with the asset tag manager 102. In one example, the asset device 106 may use the Simple Network Management Protocol (SNMP) or other protocol to facilitate communication with the asset tag manager 102. The SNMP is an application layer protocol that is part of the Transmission Control Protocol/Internet Protocol (TCP/IP) suite and is designed to facilitate the exchange of information between networked devices. The asset devices 106 may serve as managed devices of the SNMP network having an SNMP agent while the asset tag manager 102 may serve as the SNMP network management system (NMS). In another example, network 104 may include a local network using a protocol such as SNMP and a cross site network using a protocol such as Web Services with a gateway server between the two parts of the network 104. The local network of this example may be characterized by higher transaction rates and lower security requirements while the external cross site network may be characterized by lower transaction rates and higher security requirements. In this example, the asset tag manager 102 may serve as the gateway server. One skilled in the art will recognize that other network or communications protocols may also be used.

The electronic asset tag 108 may include an asset number or any other type of information. The electronic asset tag 108 may include, in one example, information about the outsourcer (or other operator of the asset tag manager 102) or the customer (or other operator of the asset device 106). Any other type of information may be stored in the electronic asset tag 108, such as maintenance, upgrade information, or asset device 106 history. Asset numbers may be any type of number or other identifier that is associated with a particular asset. Asset numbers may be different than serial numbers, as serial numbers are typically associated with particular pieces of hardware. In some situations, an asset with a fixed asset number may have changes to its hardware that result in changes to serial numbers. Accordingly, asset numbers may advantageously be more permanent than serial numbers and are thus more suitable for financial purposes such as managing asset depreciation.

The electronic asset tag 108 may be located anywhere within or as part of a particular asset device 106. In one embodiment, the electronic asset tag 108 may be included in nonvolatile device memory of the asset device 106 so that the contents of the electronic asset tag 108 are persistent in the event of power interruption. The electronic asset tag 108 may be stored in an existing memory of the asset device 106, such as by storing it in a network protocol accessible field, so that the asset device 106 need not be sent to a consolidation facility for inclusion of the electronic asset tag 108. Alternatively, the electronic asset tag 108 may be stored in a separate or dedicated memory component.

In a further embodiment, the electronic asset tag 108 may be stored in two or more locations in the asset device 106. Storing the electronic asset tag 108 in multiple locations provides additional security of the electronic asset tag 108 by preventing a single component failure from erasing the contents of the electronic asset tag 108. If an asset device 106 stores the electronic asset tag 108 in non-volatile memory of a processor as well as on a hard drive, the failure of one of those components will not result in the loss of the electronic asset tag 108 contents. If the hard drive crashed and was replaced in this example, one of its first tasks could be to gather the contents of the electronic asset tag 108 from the processor and to save those contents in its memory, reestablishing the redundant storage of the electronic asset tag.

In another further embodiment, the contents of the electronic asset tag 108 may be downloaded to a separate backup device 110. A user with the appropriate permissions may use the backup device 110 to restore the contents of the electronic asset tag 108 in the event of a replaced hardware part, data loss, or other event. The backup device 110 may be any type of storage device, such as a disk, USB or flash memory or card, or the like. In another embodiment, the backup device 108 may be a network drive or other backup device accessed over network 104.

The system of the disclosed embodiments provides an effective and efficient methodology for managing asset numbers of a plurality of distributed asset devices 106. Asset numbers and other information may be located in an electronic asset tag 108 of each network-connected asset device 106. A user may use the asset tag manager 102 to manage the asset numbers of the asset devices 106 by setting and accessing the electronic asset tags 108 of the remote asset devices 106 without having to be in the physical proximity of the asset devices 106. A user may therefore advantageously remotely set, update, and access the asset numbers stored in the electronic asset tags 108 of distributed asset devices 106. The system of the disclosed embodiments may also provide permanence to asset numbers stored in electronic asset tags 108 by storing them in a central location, in multiple locations in the asset device 106, and/or on a backup device 110. The disclosed system may also help prevent transcription errors and mismatches between device serial numbers and asset numbers. Organizations may use the disclosed system for managing the depreciation of assets or for other financial tasks, as the disclosed system may advantageously provide an efficient method of tracking assets with asset numbers that do not suffer from the possible uncertainty of serial numbers.

The system of the disclosed embodiments may be used in an outsourced printing services situation in one exemplary example. In this example, a printing services outsourcer may operate an asset tag manager 102 to manage a plurality of asset devices 106 such as system printers. The system printers may be distributed at customer facilities geographically-distributed around the world. The outsourcer may thus manage the asset devices 106 from a central location without having to visit each customer facility to audit or otherwise access the system printers, saving valuable resources. If the existing hardware and/or software of the asset device 106 is used to store the contents of the electronic asset tag 108, the need to send asset devices 106 to a consolidation facility is also eliminated, saving additional time and money. While the example described above relates to outsourced printing services, one skilled in the art will recognize that the disclosed system is suitable for any type of asset devices 106, and is particularly suitable for distributed, networked devices. In another example, the disclosed system may be used in a non-outsourcing situation for an organization with a large number of distributed assets that are valuable and network attached, such as laptop computer systems in a large corporate facility.

Figure 2:
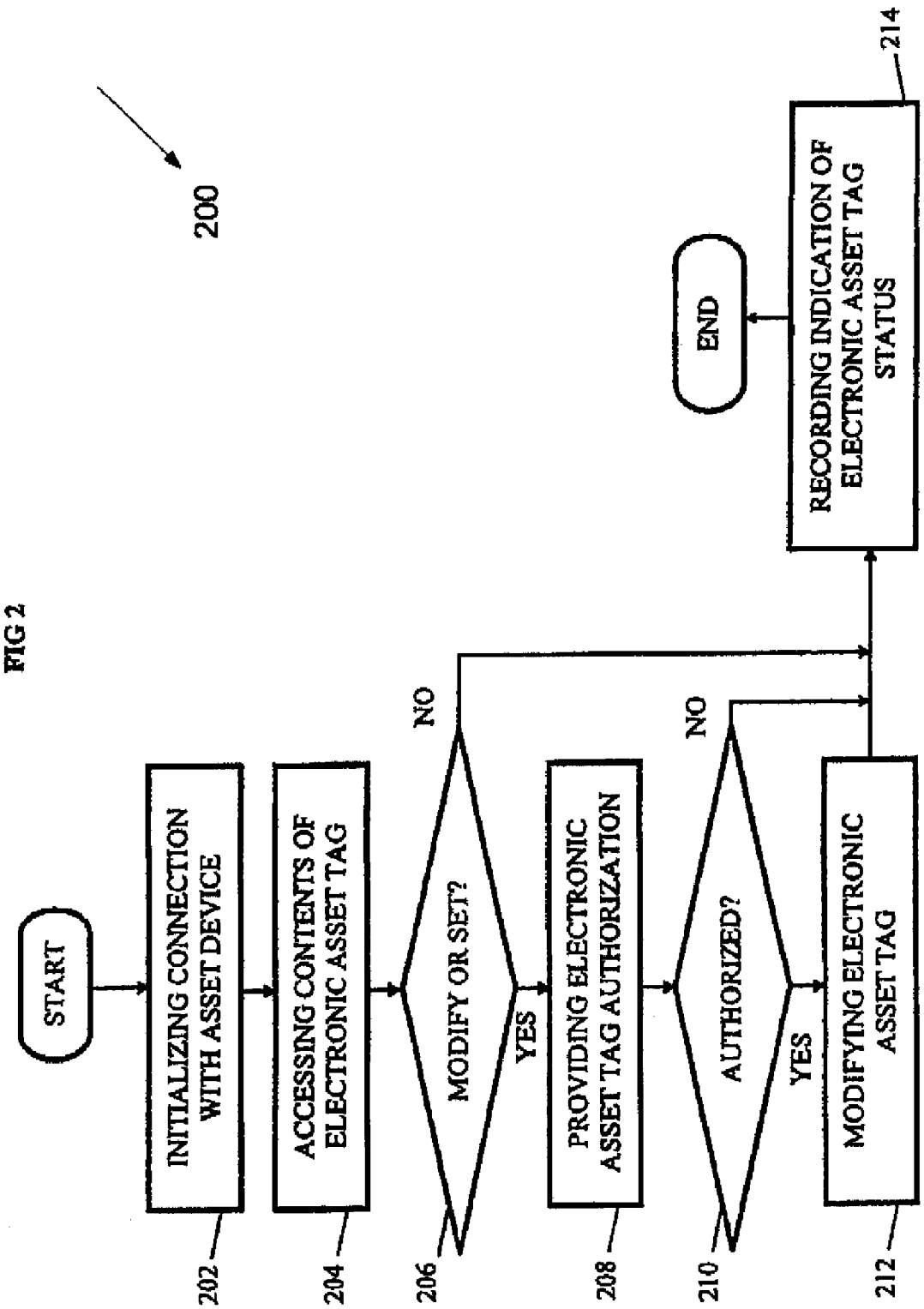
FIG. 2 depicts an example of a flow chart for remotely modifying the electronic asset tag of an asset device according to one embodiment.

FIG. 2 depicts an example of a flow chart for remotely modifying the electronic asset tag of an asset device according to one embodiment. The elements of flow chart 200 may be performed, in one embodiment, by components or combinations of components of the asset tag manager 102. Flow chart 200 begins with element 202, initializing a connection with an asset device 106. In one embodiment, the asset tag manager 102 may perform element 202 by establishing a network connection over network 104 with an asset device 106, such as an SNMP connection. After initializing the connection with the asset device 106, the asset tag manager 102 may access the contents of the electronic asset tag 108 at element 204. A user of the asset tag manager 102 may, for example, access the asset number associated with an asset device 106 for monitoring or tracking purposes. The user may typically access any of the contents of the electronic asset tag 108 without providing a password or other authentication.

The method of flow chart 200 continues to decision block 206, where the asset tag manager 102 determines whether it should set or otherwise modify the contents of the electronic asset tag 108. In one embodiment, a user of the asset tag manager 102 may request modification of the electronic asset tag 108, such as when asset numbers are being assigned or customer information need be modified. In another embodiment, the asset tag manager 102 may automatically determine a need to modify the electronic asset tag 108, such as in response to a particular event or schedule. If the asset tag manager 102 will attempt to modify the contents of the electronic asset tag 108, flow chart 200 continues to element 208; otherwise, flow chart 200 continues to element 214.

At element 208, the asset tag manager 102 provides electronic asset tag authorization to the electronic asset tag 108 and/or asset device 106. The asset tag manager 102 may provide authorization in any fashion, such as a password, computer system identification, digital signature, digital authentication, or the like. The asset tag manager 102 may receive information related to the authorization (e.g., a password) from a user or such information may be stored. The asset tag manager 102 determines at decision block 210 whether or not the asset tag manager 102 has been authorized to modify the electronic asset tag 108. The asset tag manager 102 may determine its authorization status by receiving an indication of its status from the asset device 106 over network 104. If the asset tag manager 102 is not authorized to modify the electronic asset tag 108, the method of flow chart 200 continues to element 214. This prevents an unauthorized user or system from improperly modifying the electronic asset tag 108, helping to preserve the integrity of its contents. If the asset tag manager 102 is authorized, the method of flow chart 200 continues to element 212, modifying the electronic asset tag 108. At element 212, the asset tag manager 102 may modify or set any of the contents of the electronic asset tag 108, including the asset number. This allows an authorized user to modify, correct, or initially set up asset numbers for one or more asset devices 106. The authorized user may accomplish the modifications remotely, providing an effective and efficient mechanism for managing asset numbers and other contents of electronic asset tags 108.

After modifying the electronic asset tag 108 (if such step was performed), the method of flow chart 200 continues to optional element 214, recording an indication of the status of the electronic asset tag 108, after which the flow chart terminates. In one embodiment, the asset tag manager 102 may record any changes to the contents of a particular electronic asset tag 108 discovered at element 204 or accomplished at element 212.

Figure 3:
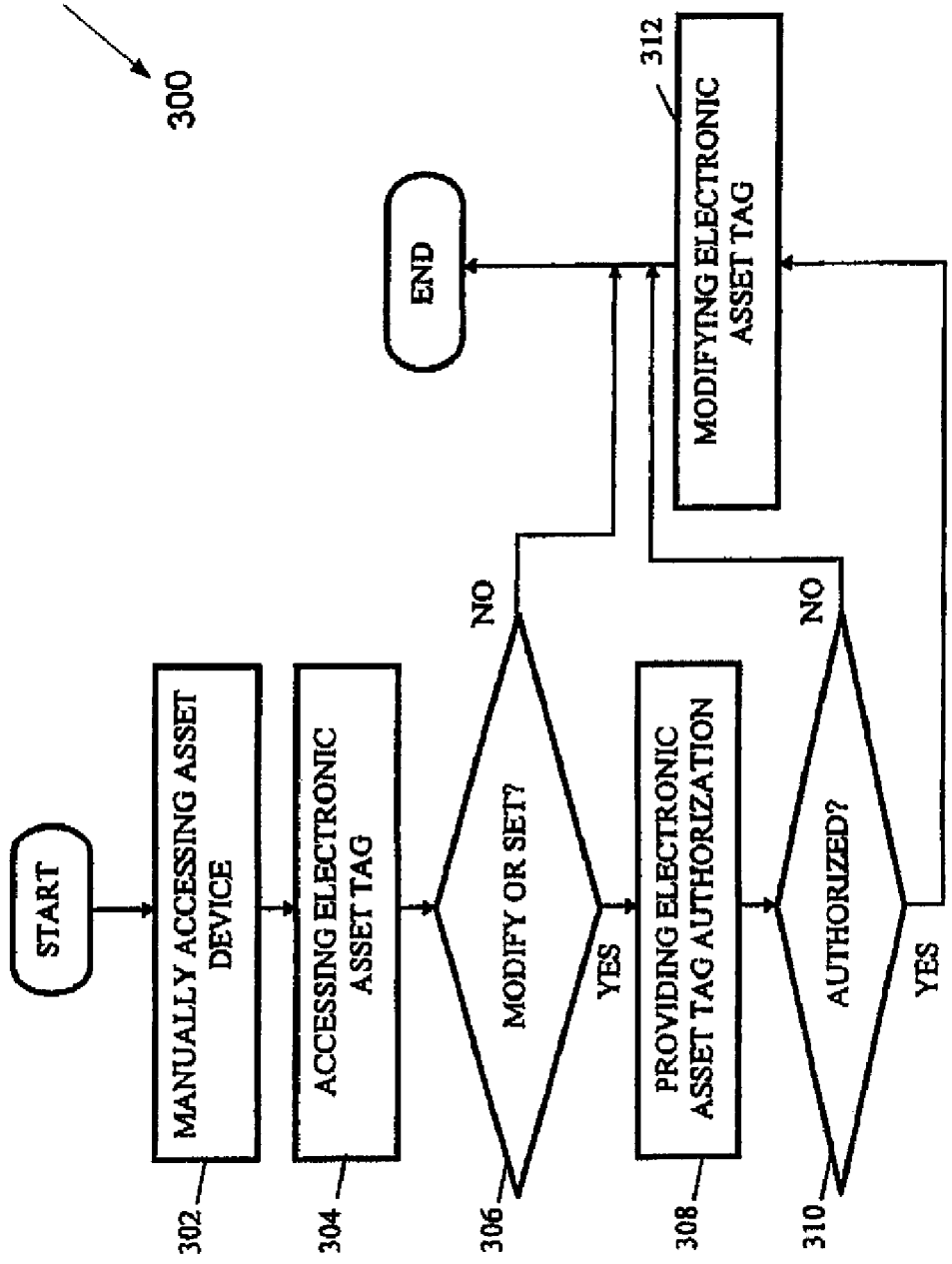
FIG. 3 depicts an example of a flow chart for manually modifying the electronic asset tag of an asset device according to one embodiment.

FIG. 3 depicts an example of a flow chart for manually modifying the electronic asset tag of an asset device according to one embodiment. The elements of flow chart 300 may be performed, in one embodiment, by user or other operator in physical proximity to an asset device 106 with an electronic access tag 108. Flow chart 300 begins with element 302, manually accessing an asset device 106. In one embodiment, the operator may perform element 302 by utilizing a control panel or other user input component of the asset device 106. For example, an operator may use a control panel that allows users to configure the asset device 106, change various settings, view current settings or status, and the like. The operator, after manually accessing the asset device 106, may then access the electronic asset tag 108 at element 304. At this element, the operator may access the contents of the electronic asset tag 108 (such as the asset number) via an output device of the asset device 106, such as a control panel, monitor, printer, or audio device. The operator may typically access any of the contents of the electronic asset tag 108 without providing a password or other authentication.

In one example, the operator may type commands on a keypad that result in the asset device 106 displaying contents of the electronic asset tag 108 such as the asset number or contact information for the owner of the asset device 106. This aspect of the method of flow chart 300 replicates the basic functionality of someone walking up to an asset device 106 and reading a sticker attached to the asset device 106, but may provide additional benefits. For example, the electronic asset tag 108 may contain more information than a physical sticker, such as contact information for the outsourcing organization that owns the asset device 106. The electronic asset 108 may also be more accurate and up to date than a physical sticker.

The method of flow chart 300 continues to decision block 306, where the operator may determine whether she should set or otherwise modify the contents of the electronic asset tag 108. If the operator desires to attempt to modify the contents of the electronic asset tag 108, flow chart 300 continues to element 308; otherwise, flow chart 300 terminates. At element 308, the operator may provide electronic asset tag authorization to the asset device 106. The operator may provide authorization in any fashion, such as a password, computer system identification, digital signature, digital authentication, or the like. In one example, the operator may enter an authorization password on a user input device (e.g., keypad)

of the asset device 106. If the operator is authorized (e.g., enters the correct password), the method of flow chart 300 continues to element 312, and if the operator is not authorized, the method of flow chart 300 terminates. At element 312, the operator may modify or set any of the contents of the electronic asset tag 108, including the asset number, after which the method terminates. This allows an authorized operator to modify, correct, or initially set up asset numbers for one or more asset devices 106. The method of flow chart 300 may work in conjunction with flow chart 200 of FIG. 2, allowing the contents of the electronic asset tag 108 to be modified both by a central asset tag manager 102 as well as operators in the field.

Figure 4:
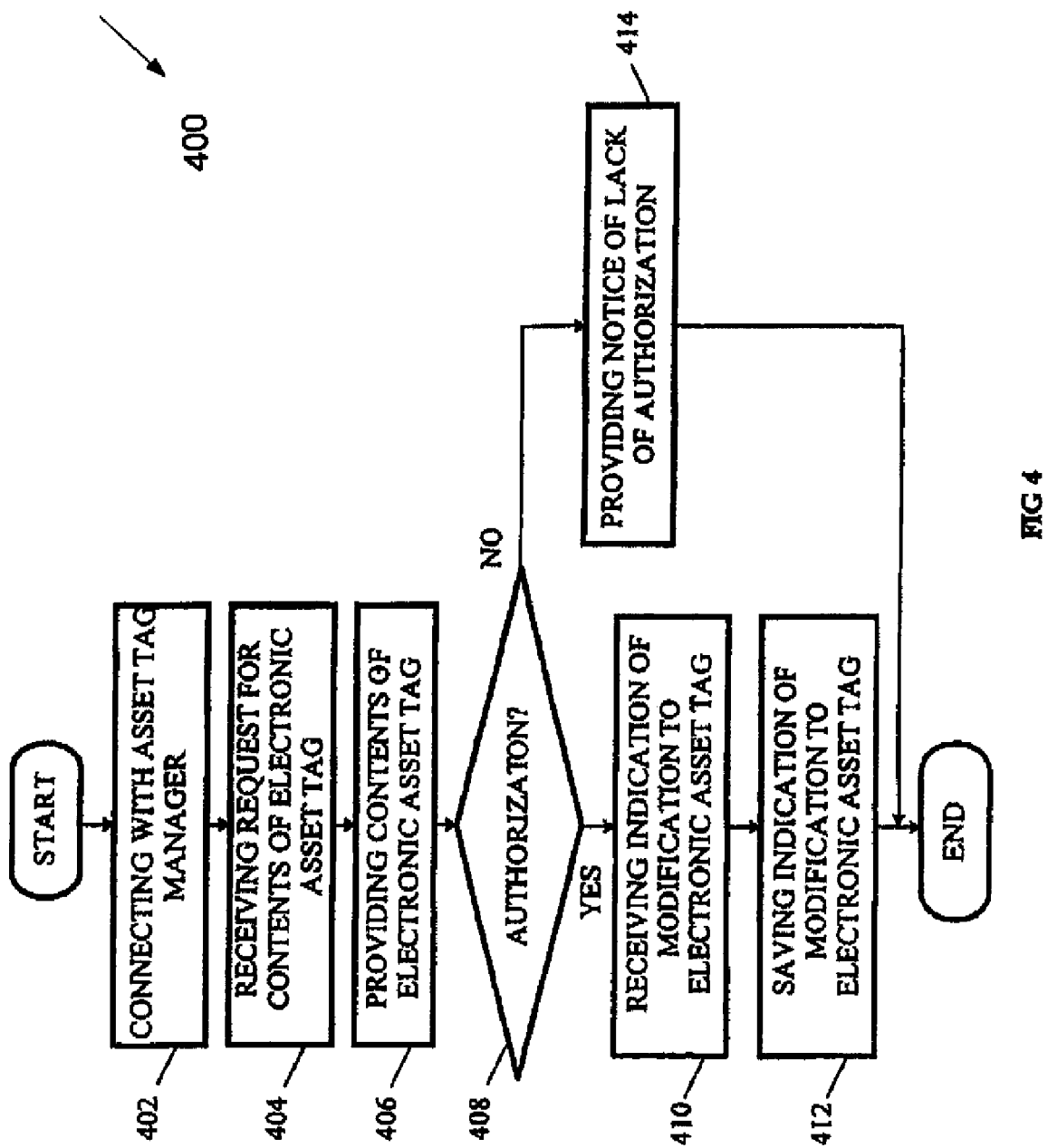
FIG. 4 depicts an example of a flow chart for modifying the electronic asset tag of an asset device in response to an authorized request according to one embodiment.

FIG. 4 depicts an example of a flow chart for modifying the electronic asset tag of an asset device in response to an authorized request according to one embodiment. The elements of flow chart 400 may be performed, in one embodiment, by components or combinations of components of an asset device 106. Flow chart 400 begins with optional element 402, connecting with an asset tag manager 102. In one embodiment, the asset device 106 may establish a network connection such as an SNMP connection over network 104 with the asset tag manager 102. Element 402 may be skipped if an operator is physically accessing the asset device 106, as a network connection need not be established. After the connection is established (if element 402 is performed), the method of flow chart 400 continues to optional element 404, where the asset device 106 may receive a request for some or all of the contents of the electronic asset tag 108. The asset device 106 may receive the request via user input or from the asset tag manager 102 via network 104. If the asset device 106 does receive a request for the electronic asset tag 108 contents, it may then provide the requested contents at element 406. In one embodiment, the asset device 106 does not require authorization for displaying the contents of the electronic asset tag 108.

After providing the contents of the electronic asset tag 108 (if requested), the method of flow chart 400 continues to decision block 408, where the asset device 106 may determine whether the asset tag manager 102 and/or operator is authorized to modify the contents of the electronic asset tag 108. Decision block 408 may be performed in response to a request to modify the electronic asset tag 108 from the asset tag manager 102 and/or operator. The asset device 106 may use any methodology to determine whether the asset tag manager 102 and/or operator is authorized, such as by comparing a supplied password to a stored one, based on the identity of the computer system serving as the asset tag manager 102, based on a digital signature or authentication, or the like.

If the asset tag manager 102 and/or operator are authorized, the method of flow chart 400 continues to element 410, receiving an indication of the modification to the electronic asset tag 410. Alternatively, the receipt of such indication may also serve as the notice to the asset device 106 that a modification to the electronic asset tag 108 is desired, resulting in element 410 being performed before element 408. The indication of the modification may include a new or modified asset number, outsourcer or customer information, or any other type of information. After receiving the indication of a modification at element 410, the asset device 106 may save the indication of the modification to the electronic asset tag 108 at element 412, after which the method terminates. The asset device 106 may save the modification to the electronic asset tag 108 by saving changes to any of the electronic asset tag 108 content, saving a reset or changed asset number by replacing the previous asset number, or saving any other indications.

If the asset tag manager 102 and/or operator are not authorized, the asset device 106 may optionally provide notice of the lack of authorization to the requester at element 414, after which the method terminates. In one embodiment, the asset device 106 may provide the requester with additional opportunities to become authorized, such as by allowing the requester to attempt another password or provide a different identification.

Figure 5:
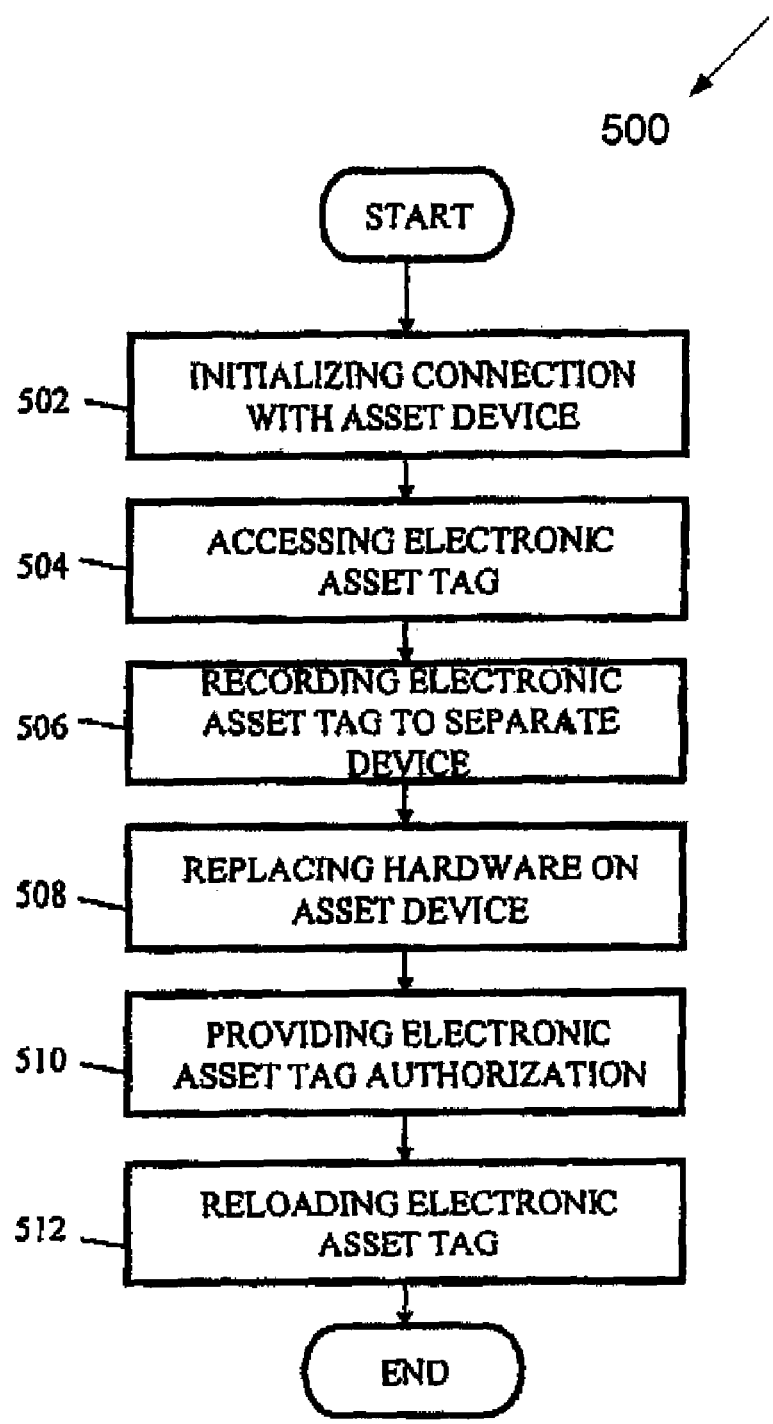
FIG. 5 depicts an example of a flow chart for backing up and restoring the electronic asset tag of an asset device according to one embodiment.

FIG. 5 depicts an example of a flow chart for backing up and restoring the electronic asset tag of an asset device according to one embodiment. The elements of flow chart 500 may be performed, in one embodiment, by components or combinations of components of the asset management system 100. Flow chart 500 begins with element 502, initializing a connection with an asset device 106. In one embodiment, the asset tag manager 102 may perform element 502 by establishing a network connection over network 104 with an asset device 106, such as an SNMP connection. After initializing the connection with the asset device 106, the asset tag manager 102 may access the contents of the electronic asset tag 108 at element 504. A user of the asset tag manager 102 may, for example, access the asset number associated with an asset device 106 for monitoring or tracking purposes. The method of flow chart 500 continues to element 506, recording the contents of the electronic asset tag 108 to a separate device. At element 506, an asset tag manager 102 may save the contents of the electronic asset tag 108 to a database 112 or other storage device.

At optional element 508, an operator may replace hardware and/or software on the asset device 106 that contain some or all of the contents of the electronic asset tag 106, such as in the event of failure of that hardware and/or software. In this embodiment, an operator in physical proximity to the asset device 106 may perform elements 502, 504, 506, and 508. The operator may access the asset device 106 via a keypad or other user interface and may record the contents of the electronic asset device 108 to a separate device such as a memory key, floppy disk, or other backup device 110. This embodiment may be useful in a scenario where someone servicing the asset device 106 desires the capability to backup the contents, replace the hardware and/or software, and then reload the contents of the electronic asset tag. This methodology provides an additional level of permanence to the asset number and other contents of the electronic asset tag 108.

After completing the backup process at elements 502, 504, and 506, the restore process may then commence. At optional element 510, the asset tag manager 106 and/or operator may provide authorization to modify the electronic asset tag 108 contents, if such authorization is required. The asset tag manager 106 and/or operator may then reload the contents to the electronic asset tag 108 at element 512, after which the method terminates. The method of flow chart 500 may thus be used to backup and restore the contents of the electronic asset tag 108, providing an additional layer of security that may work in conjunction with storage of asset numbers and other content in database 112 as well as storage of the electronic asset tag 108 in multiple places in the asset device 106.

Each software program described herein may be operated on any type of computer, such as personal computer, server, etc. Any programs may be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet, intranet or other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates methods, systems, and media for managing electronic asset tags for asset devices. It is understood that the form of the invention shown and described in the detailed description and the drawings are to be taken merely as examples. It is intended that the following claims be interpreted broadly to embrace all the variations of the example embodiments disclosed.

What is claimed is:

1. A machine-accessible medium containing instructions effective, when executing in a data processing system, to cause said data processing system to perform operations comprising:
    accessing an electronic asset tag of an asset device, the electronic asset tag having contents comprising an asset number;
    providing electronic asset tag authorization to the asset device, wherein providing electronic asset tag authorization comprises providing a password, a digital signature, a digital authentication, and an indication of identification; and
    after providing electronic asset tag authorization, modifying the contents of the electronic asset tag of the asset device, the operations further comprising:
    (i) initializing a connection with the asset device, prior to accessing the electronic asset tag;
    (ii) recording the assessed electronic asset tag to a separate device;
    (iii) replacing hardware in the asset device, subsequent to the recording of the assessed electronic asset tag to the separate device, wherein the replaced hardware includes at least some contents of the electronic asset tag;
    (iv) providing authorization to modify the electronic asset tag, subsequent to replacing the hardware in the asset device; and
    (v) reloading the electronic asset tag from the separate device.

2. The machine-accessible medium of claim 1, further comprising after modifying the electronic asset tag, recording an indication of a status for the electronic asset tag.

3. The machine-accessible medium of claim 1, wherein the electronic asset tag comprises one or more of an indication of an owner associated with the asset device, and an indication of a customer associated with the asset device.

4. The machine-accessible medium of claim 1, wherein modifying the contents of the electronic asset tag of the asset device comprises updating the asset number of the asset device.

5. A system for managing asset numbers, the system comprising:
    one or more asset devices in communication with a network, the asset devices each having an electronic asset tag, the electronic asset tags having contents comprising an asset number associated with the asset device having the electronic asset tag, wherein electronic asset tag authorization is provided to the one or more asset devices, and wherein providing electronic asset tag authorization comprises providing a password, a digital signature, a digital authentication, and an indication of identification; and
    an asset tag manager in communication with the network, the asset tag manager being adapted to access the contents of the electronic asset tags of the one or more asset devices wherein a connection is initialized with a first asset device, prior to accessing a first electronic asset tag of the first asset device, wherein
    (i) the assessed first electronic asset tag is recorded to a separate device;
    (ii) hardware is replaced in the first asset device, subsequent to the recording of the assessed first electronic asset tag to the separate device;
    (iii) the replaced hardware includes at least some contents of the first electronic asset tag;
    (iv) authorization is provided to modify the first electronic asset tag, subsequent to replacing the hardware in the first asset device; and
    (v) the first electronic asset tag is reloaded to the first asset device from the separate device.

6. The system of claim 5, further comprising a database in communication with the asset tag manager, the database being adapted to store contents of the electronic asset tags.

7. The system of claim 5, wherein one or more of the asset devices are adapted to store the contents of their electronic asset tags in multiple locations within the asset device.

8. The system of claim 5, wherein one or more of the asset devices are adapted to transmit the contents of their electronic asset tags to a backup device.

9. The system of claim 5, wherein the asset tag manager is further adapted to modify the contents of the electronic asset tags of the one or more asset devices.

10. The system of claim 5, wherein the asset tag manager is further adapted to reload to an asset device the contents of the electronic asset tag of the asset device.

* * * * *